Sept. 16, 1969 P. J. CRANE 3,467,772

FM DEMODULATOR CIRCUIT FOR USE IN A FACSIMILE SYSTEM

Filed March 18, 1966 2 Sheets-Sheet 1

INVENTOR:
Paul J. Crane

By Smyth, Roston & Pavitt
Attorneys

FM DEMODULATOR CIRCUIT FOR USE IN A FACSIMILE SYSTEM

Filed March 18, 1966 2 Sheets-Sheet 2

INVENTOR:
Paul J. Crane

By Smyth, Roston & Pavitt
Attorneys

United States Patent Office 3,467,772

Patented Sept. 16, 1969

3,467,772
FM DEMODULATOR CIRCUIT FOR USE IN A FACSIMILE SYSTEM

Paul J. Crane, Torrance, Calif., assignor to The Magnavox Company, a corporation of Delaware Filed Mar. 18, 1966, Ser. No. 535,442
Int. Cl. H04n 1/40
U.S. Cl. 178—6 9 Claims

ABSTRACT OF THE DISCLOSURE

This invention relates to a facsimile system which converts an image into frequency modulated signals representing the image and transmits the signals to a receiver which demodulates the signals to recover the image. The system includes a demodulator which converts the frequency modulated signals to signals having substantially no duration in representation of white color and having a progressively increasing duration in progressively increasing shades of color toward black. The demodulator further has characteristics of producing a reference voltage for a white color and of producing progressive variations from the reference voltage for progressive variations toward a black color. By providing the demodulator with these characteristics, an accurate reproduction of the image at the receiver is obtained.

This invention relates to facsimile transceivers of the sort described in application Ser. No. 669,315 filed Sept. 20, 1967 on behalf of Glenn A. Reese and Paul J. Crane entitled "Facsimile Systems," which in turn is a continuation of application Ser. No. 549,759 (now abandoned) filed Apr. 21, 1966 and entitled "Facsimile Systems," which in turn is a continuation of application Ser. No. 176,248 (now abandoned) filed Feb. 28, 1962 and entitled "Facsimile Systems," for transmitting the contents of documents to remote locations using standard telephone transmission facilities; and, more particularly, there is disclosed herein a frequency-modulated signal demodulation system (FM demodulator) that is particularly well adapted to provide optimum reception therein.

Briefly speaking, the function of a facsimile transceiver system of the sort referred to in application Ser. No. 669,315 is to scan documents at a transmit station and develop an electrical signal representative of the contents of the document. This electrical signal is then modulated into a form suitable for transmission over standard telephone transmission lines. The preferred form of modulation for such "base band" signals is to frequency-modulate them at a low frequency in the audio range transmittable by ordinary telephone circuitry, preferably in the range of 1500 c.p.s. to 2500 c.p.s.

The FM-modulated signal is then coupled into standard telephone transmission lines and taken therefrom again at the receiving station through the same standard handsets that are used for regular voice transmission, so that no special jacks or other electrical hookups are required. With such an arrangement a facsimile transceiver can be used as a portable or movable office appliance, and operation becomes simple enough that the office personnel using the transmitting and receiving transceivers can simply dial one another in the conventional way and arrange for the transmissions. At the receiving station the above-mentioned FM-modulated facsimile signal is demodulated to provide an electrical signal that operates a printing device. The printing device then reproduces the contents of the document originally scanned at the transmit station. The purpose of the instant invention is to provide an improved FM demodulator for use at the receiving station.

The two great disadvantages of FM transmission in the facsimile system discussed above are (1) the low frequency band width of the FM compared to the highest modulation frequency (necessary in order to transmit over an audio system such as a telephone line) means that the fundamental frequency of the FM signals being demodulated by a receive-mode transceiver set is very low. Such low fundamental waveforms and FM require large and expensive filters in order to convert them into sufficiently smooth DC. One object of the instant invention is to eliminate the necessity for the expensive and complex filtering systems heretofore used in the facsimile transceiver of the above-cited Ser. No. 669,315 system.

Secondly, the FM system used in facsimile transmission of necessity has one end of its band width representing white paper and the other end of its band width representing black paper. At the white paper end, even a slight deviation in the DC output voltage of the FM demodulator will shift the white to gray, producing an off-shade ugly copy of the receive-mode transceiver. Another object of the instant invention is to provide an FM demodulation system wherein the accuracy of demodulation especially at the low frequency end of the band width (corresponding to "white paper") is made more precise.

In the achievement of the above and other objects and as a feature of the instant invention there is provided a new FM demodulation system wherein a first monostable multivibrator circuit and a second monostable multivibrator circuit are operated in parallel, both beng triggered by the same input FM signals. The time-constant circuitry resistances and capacitances of the two parallel monostable multivibrators are so chosen that the first monostable multivibrator has a very quick recovery time, while the second monostable multivibrator has just enough time to recover at the lowest frequency in the band with of the detector. At frequencies higher than this lowest frequency the second monostable multivibrator is not able to recover fully. Therefore, by developing an output signal conditioned upon the difference of the timed states of both the first monostable multivibrator and the second monostable multivibrator, a detector output signal may be developed that has zero power at "white" level and increasing power therebeyond.

As the frequency of the FM input signal increases, the recovery time of the first monostable multivibrator and the second monostable multivibrator decreaes, giving the overall result that a larger output signal is produced by the detector as the frequency of the FM input signal goes up. This output signal consists of a train of pulses at a frequency corresponding to the frequencies of the input to the detector, but with a pulse width that is approximately proportional to the rise in the input frequencies above the low end of the FM band width. Since the output pulses are of the same amplitude, the amount of power passed within their envelopes is proportional to their duty cycle—or, in other words, their duration—and thus also rises approximately linearly from the "zero-power frequency" at the low end of the FM band width. The pulses from the detector are subsequently filtered to provide a variable DC output signal. Since at the low end of the band width almost no power is passed to the filter by the detector, the heretofore difficult problem of high zero-level AC-carrier output voltage is avoided.

Other objects and features of this invention and a fuller understanding thereof may be had by referring to the following description and claims taken in conjunction with the accompanying drawings in which:

Figure 1:
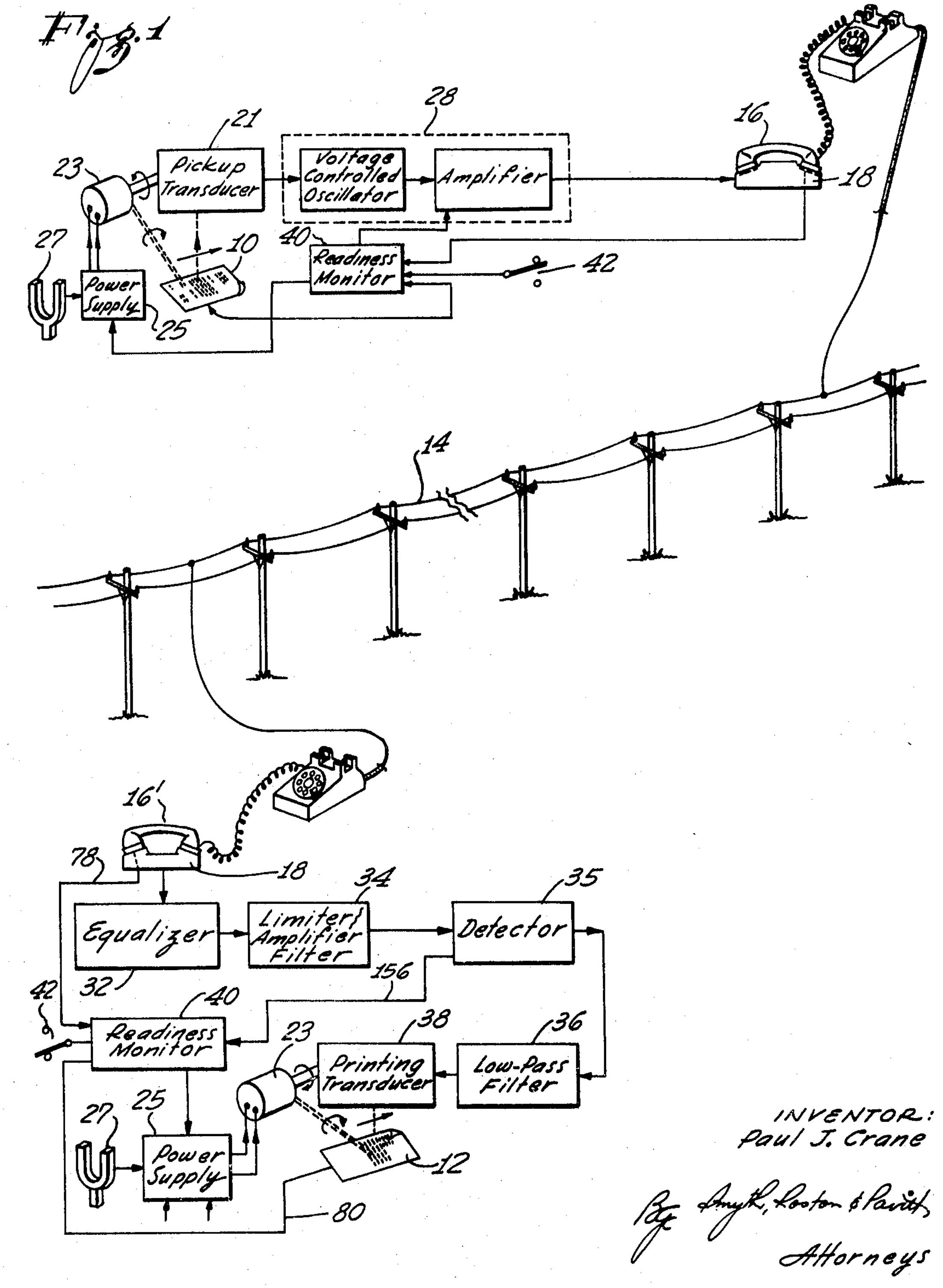
FIGURE 1 is a block diagram of a facsimle transceiver in which the readiness monitoring system of the instant invention is incorporated.

The system shown in FIGURE 1 represents a facsimile system which is disclosed in detail in application, Ser. No. 669,315 filed Sept. 20, 1967 in the name of Glenn A. Reese and Paul J. Crane entitled Facsimile Systems and Ser. No. 458,954 filed May 26, 1965 in the names of Rex J. Crookshanks and Glenn A. Reese, entitled Facsimile Transmission System.

Referring to FIGURE 1, the facsimile transceiver system upon which the instant invention is an improvement has for its purpose the scanning of an original 10 and the reproduction of the contents of the original 10 upon copy paper 12 at a remote location, using standard commercial telephone transmission facilities (represented by the lines 14) to transmit the facsimile signals. The system of FIGURE 1 represents the most advanced practice of the facsimile transmission art, according to which facsimile signals may be sent and received through standard commercial telephone handsets 16 when properly positioned upon acoustical coupling sets 18. In the transmit mode of a facsimile transceiver set (shown in that portion of the block diagram in FIGURE 1 above the transmission lines 14), the acoustical couplers 18 receive electrical signals from the transceiver and convert them into acoustical signals which are then coupled into the handset 16. In the receive mode of a facsimile transceiver (shown in block diagram below the transmission lines 14 in FIGURE 1) the transceiver acoustical coupler 18 receives acoustical signals from the handset 16 and converts them into electrical signals for processing by the transceiver.

The scanning of the original 10 is accomplished by a pickup transducer 21 mounted in such manner as to be rotated by an electrical motor 23, preferably of the hysteresis-synchronous variety, controlled by signals from a power supply or motor drive amplifier 25 (hereinafter called "power amplifier 24" for short) which derives its control signals from a frequency standard such as that provided by a turning fork 27 (or, alternatively, a crystal-controlled oscillator or other highly accurate frequency source). The electrical signals produced by the pickup transducer 21 in response to the written matter on the original 10 frequency modulate at 28. It is the practice to have "white" or blank spaces on the original show as unmodulated FM carrier (in one example, 1500 c.p.s. carrier frequency) at the output of the modulator 28.

The frequency-modulated signals from the modulated 28 are then fed to the acoustical coupler 18 which directs the signal into the telephone transmission facilities 14 through the handset 16, to a receiving handset 16'. Since standard commercial telephone are used at both ends in the system of FIGURE 1, either the sending or the receiving stations may initiate the transmission by dialing the other in the conventional manner.

The transmissions received by the handset 16' are transduced by the receiving or reproducing set acoustical coupler 18 into electrical signals which are fed to an equalizer circuit 32 which compensates for the effects of transmission line distortion. The distortion-compensated signal from the equalizer 32 is fed to a limiting and filtering network 34 which serves to reduce noise and signals other than the main FM carrier which was originally transmitted. Thereafter, the signal is demodulated by a detector system 35 of the sort to which the present invention is addressed. The detector 35 output pulses are fed to a low-pass filter 36 to be smoothed into a low-frequency or variable DC signal which controls a printing transducer 38 which writes on the copy paper 12. The printing transducer 38 scans and prints in phase with the pickup transducer 21 due to rotation by another hysteresis synchronous motor 23 powered from a power amplifier 25 deriving frequency signals from a frequency standard 27 identical to one being used by the transmit mode.

As stated above, the FM signals sent by the facsimile transceiver system of FIGURE 1 must be in a frequency range in which the telephone lines 14, the handsets 16 and all their associated amplifiers and the like are responsive. It has been the practice of facsimile transmission to use an FM band running from 1500 c.p.s., to 2500 c.p.s. with 1500 c.p.s. representing unmodulated carrier or lightest document tones (in other words, "white"), while the 2500 c.p.s. upper band limit represents darkest document tones (in other words, "black"). In the past, this 1500–2500 c.p.s. FM band has required large and expensive filters to perform demodulation because of the low fundamental frequency of the detected signal to be filtered. Even worse, the filtering was least effective at the lower end of the FM band, so that the very critical voltage level representing "white paper" received the least effective processing, with the result that the prior FM demodulators in facsimile transmission had to be very complex and very carefully adjusted in order to prevent a slight graying of the copy paper of the facsimiles produced by the receive-mode transceiver. The principles of the instant invention as embodied in the circuit of FIGURE 2 lead to the production of a detector output signal which has its output energy located chiefly in the harmonics of the fundamental frequency at the "white" level or low end of the FM band width, so that filtering is most effective at that point. Moreover, to further minimize the possibility of a slight gray signal being produced, the power passed from the FM detector is also minimal and almost non-existent at the low end of the FM band width.

Figure 2:
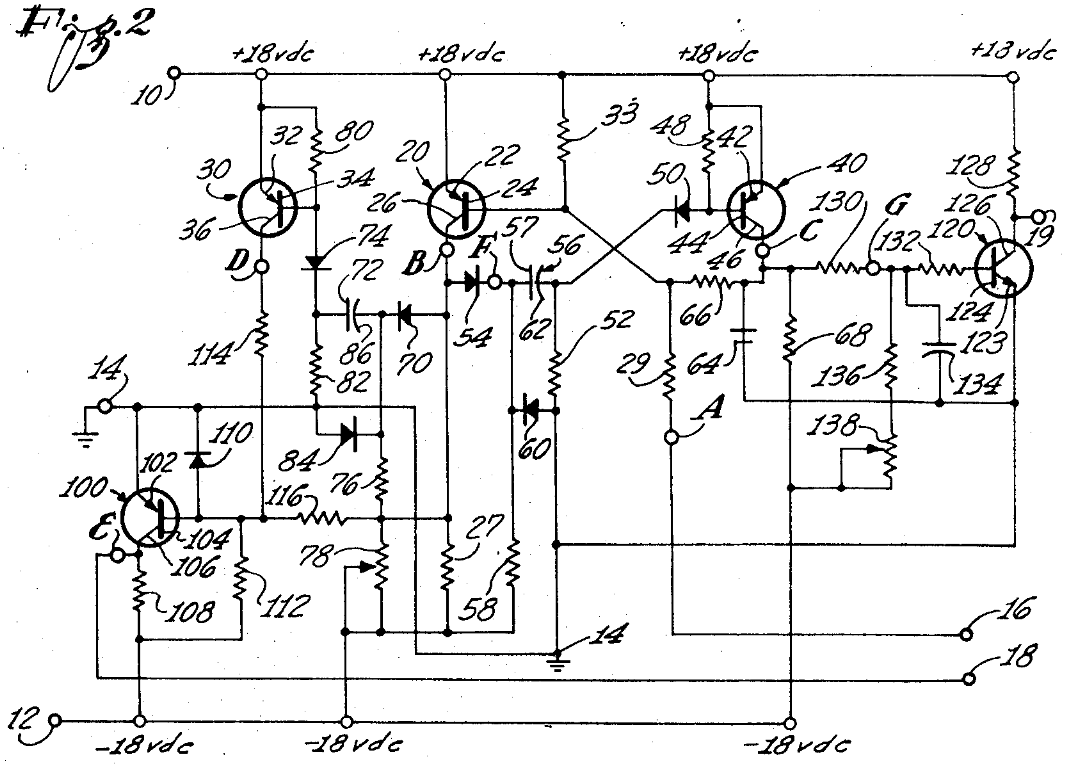
FIGURE 2 is a schematic diagram of the circuit which is a preferred embodiment of the principles of this invention.

The circuit shown schematically in FIGURE 2 has a positive power supply 10, a negative power supply 12, a ground terminal 14, an input terminal 16, a detector output signal terminal 18 and a carrier reception indication signal terminal 19. In a model built according to the circuit of FIGURE 2, the positive power supply 10 was +18 volts DC, while the negative power supply 12 was —18 volts DC.

Figure 3:
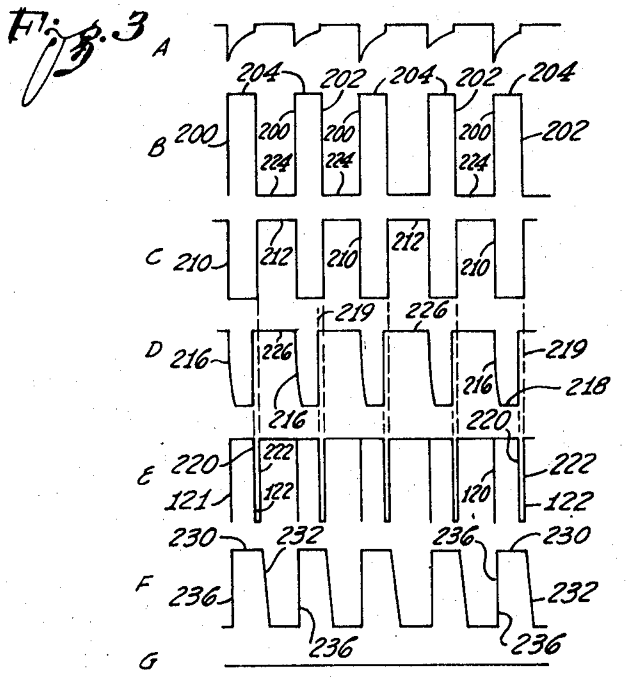
FIGURE 3 is a graph of waveforms at certain points in FIGURE 2.

The input signal applied at the terminal 16 takes the form shown at A in FIGURE 3 and is derived from the FM carrier arriving at the receive-mode transceiver by limiting and squaring the carrier waveform, phase splitting the squared signal, differentiating each leading and trailing edge of the squared signal phases, and full-wave rectifying the negative-going differentials of each phase to provide triggering pulses at double the frequency of the input FM. This doubling of frequency has the advantage, of course, of getting a detector output frequency that is of higher frequency and thus more easily filterable. Moreover, the overall detector or demodulator system 35 benefits from the above-described processing in that the detector output frequency is thereby more widely separated from the highest frequency of the information signal imposed upon the input FM carrier.

The functions here required of a double monostable multivibrator circuit are provided by three transistors 20, 30 and 40. The general arrangement of the circuit is such that the transistor 20 is the normally-off transistor in the monostable multivibrator arrangement, while the transistors 30 and 40 are normally on. The transistor 40 cooperates with the transistor 20 to form one monostable multivibrator circuit that has a fast enough recovery rate to be able to perform or "time" uniformly throughout the band width of input FM frequencies. On the other hand, the transistor 30 and its associated components cooperates with the transistor 20 to form a partial monostable multivibrator circuit which can fully recover only at the lowest frequency in the FM band width.

The transistor 20 has an emitter 22, base 24 and collector 26. The emitter 22 is directly connected to the positive power supply 10 and is connected through a biasing resistor 33 to the base 24. The base 24 is connected through a resistor 29 to the input terminal 16, where the triggering pulses shown in FIGURE 3A arrive in the circuit of FIGURE 2. Thus the triggering pulses 3A are applied through the resistor 29 to the base 24 of the transistor 20. Because they are negative-going, they pulse the transistor 20 on.

The transistor 40 has emitter 42, base 44, and collector 46. The emitter 42 is directly connected to the positive power supply 10 and is connected through a biasing resistor 48 to the base 44. The base 44 is connected through the series combination of a diode 50 and a resistor 52 to the ground terminal 14. Because the emitter 42 is held at the voltage of the positive power supply 10, while the voltage on the base 44 tends to drop toward the voltage of the ground terminal 14, the transistor 40 is normally in its saturated state in the operation of the circuit of FIGURE 2. However, the collector 26 of the transistor 20 is connected through the series combination of a diode 54 and a time-constant capacitor 56 to the base 44 of the transistor 40. Thus when a trigger pulse at 16 switches the transistor 20 on, so that its collector 26 suddenly goes from a voltage near that of ground line 14 to a voltage near that of the positive power supply 10, capacitor 56 transfers this change so that the voltage on the base 44 is raised abruptly to turn off the transistor 40.

A first plate 57 of the capacitor 56 is connected through a resistor 58 to the negative power supply 12 and is connected through a diode 60 to ground 14. When the transistor 40 is on and the transistor 20 is off, the plate 57 of the capacitor 56 is held very near the voltage of the ground line 14 through its coupling thereto by the diode 60. A second plate 62 of the capacitor 56 is connected to the ground line 14 through resistor 52, but is held at a potential provided by the base emitter junction (42–44) of transistor 40 and diode 50 which is near in voltage to the positive supply 10.

When the transistor 20 is switched on by a pulse applied at the input terminal 16, the voltage on the plate 57 of the capacitor 56 suddenly rises to very near the voltage of the positive power supply 10. Since the voltage across a capacitor cannot change instantaneously, this rise in the voltage of the plate 57 causes the voltage on the plate 62 to rise by a similar amount, so that the voltage on the plate 62 is more positive than the positive power supply 10. Because the diode 50 blocks reverse current flow, the entire rise in voltage of the plate 62 is not communicated to the plate 44 of the transistor 40, but the plate 44 is elevated to a point where the transistor 40 turns off.

The effect of the input differential pulses shown in FIGURE 3A upon the transistors 20 and 40 is shown by the waveforms of FIGURES 3B and 3C. FIGURE 3B shows the voltage on the collector 26 of the transistor 20, while FIGURE 3C shows the voltage on the collector 46 of the transistor 40. It can be seen that when the transistor 40 is switched off in the manner described above, the voltage on its collector 46 drops from that of the positive power supply 10 to a voltage very near that of the ground terminal 14, due to the coupling of the collector 46 to ground 14 through a diode 64. Since the collector 46 is connected through a resistor 66 to the base 24 of the transistor 20, the near-ground potential thereof will be communicated to the base 24 to hold the transistor 20 turned on, for the resistors 33 and 66 will then combine with another resistor 68 connected between the collector 46 and the negative power supply 12 to provide voltage division which ensures that the collector 46 is at ground potential and indeed would be below it were not for the diode 64.

Immediately upon having its plate 57 raised to a high positive voltage due to the switching on of the transistor 20, the capacitor 56 begins to discharge through the resistor 52 to the ground line 14. The relative values of the capacitor 56 ad the resistor 52 are chosen such that this discharge can take place in plenty of time before the arrival of another trigger pulse at the terminal 16. The discharge of the capacitor 56 has the effect of lowering the potential between its first plate 57 and its second plate 62, so that the potential on the base 44 of the transistor 40 begins to drop. When this potential finally goes low enough to switch the transistor 40 into its conductive state, the collector 46 thereof is suddenly raised to the level of the positive power supply 10 and the transistor 20 is turned off by the connection between the collector 46 of the transistor 40 and the base 24 of the transistor 20. The transistor 40 then continues in its saturated state and the transistor 20 continues its cut-off state until another pulse arrives at 16.

The above discussion described the performance of the monostable multivibrator centered about the transistors 20 and 40 in response to input pulses at 16. According to the principles of the instant invention, another partial monostable multivibrator circuit is formed about the transistors 30 and 20, for the collector 26 of the transistor 20 is connected through the series combination of a diode 70, a capacitor 72, and a diode 74 to the base 34 of the transistor 30. The base 34 being the control electrode of the transistor 30, the voltages on the collector 26 of the transistor 20 have a similar effect on the transistor 30 to the effect described in respect to the transistor 40. Just as the capacitor 56 discharges to the ground line 14 through the resistor 52, so the capacitor 72 discharges to the ground line 14 through resistor 82. The capacitors 72 and 56 have substantially equal values, and resistors 52 and 82 have substantially equal values, which conditions yield equal discharge times, provided that the initial voltages on capacitors 72 and 56 are equal.

Similarly to the electrical connections of the transistor 40, the transister 30 has a biasing resistor 80 connected between its base 34 and its emitter 32. Likewise, its base 34 is connected through the diode 74 and a resistor 82 to the ground line 14, and a diode 84 similar to the diode 60 ensures that a first plate 86 of the capacitor 72 can never drop below ground potential. The voltages on the collector 36 of the transistor 30 are shown as waveform D of FIGURE 3.

The detected output of the circuit of FIGURE 2 is applied to the terminal 18 through a transistor 100 having emitter 102, base 104, and collector 106. The emitter 102 is directly connected to the ground line 14, while the collector 106 is connected through a resistor 108 to the negative terminal 12. The base 104 is connected to the ground line 14 through a diode 110 and is connected to the negative line 12 through a resistor 112. Since the base 104 is the control electrode of the transistor 100, signals from the collector 36 of the transistor 30 are coupled thereto through a resistor 114, while signals from the collector 26 of the transistor 20 are also coupled thereto through a resistor 116. In actual circuits built according to the schematic of FIGURE 2, the resistors 114 and 116 were chosen as equal in value. The resistor 112 was then chosen so as to be smaller in value than either the resistor 114 or the resistor 116, but larger in value than the total resistance of the parallel combination of the resistors 114 and 116. The result of this arrangement is that when either one of the transistors 20 or 30 is on while the other is off, voltage division between the positive power supply 10 and the negative power supply 12 through the "on" transistor 20 or 30, thence through either the resistor 114 or the resistor 116, and finally through the resistor 112 to the negative line 106, will cause the base 104 of the transistor 100 to fall below the ground potential of the emitter 102, thus making the transistor 100 conductive. For similar reasons, the base of the transistor 100 will receive a negative potential and cause the transistor 100 to become conductive when both of the transistors 20 and 30 are non-conductive. When the transistor 100 is conductive, the collector of the transistor 100 and accordingly the output terminal 18 are at substantially ground potential. On the other hand, if both the transistor 20 and the transistor 30 are "on" (conductive) the voltage on the base 104 will be above ground potential so that the transistor 100 is switched to a non-conductive state, thereby causing the collector of the transistor 100 to be at a negative potential of approximately −18 volts. In this manner the output waveforms B and D of the transistors 20 and 30 are essentially AND gated to provide the waveforms E on the terminal 18 to the output of the detector.

An examination of FIGURE 3E will show that the waveform shown there has exactly the characteristics desirable for facsimile transmission or indeed for any FM transmission at low frequencies. At the outset, it should be noted that the transient spikes 121 shown in FIGURE 3E are not purposely generated there or indeed at all useful in the demodulation process contemplated by the invention. They occur due to the difference in switch-on and switch-off time of most transistors. Since they are both small in power content and steep in both rise and fall, they are easily filtered off and are insignificant in the final demodulated output of the system using the detector of FIGURE 2. The significant pulses in FIGURE 3 are those shown at 122.

Inasmuch as no proportional voltage signal is produced on the output treminal 18 by the circuit of FIGURE 2 when the input frequency is below the detector band width, it is necessary to demodulate the receive signal in a more conventional fashion if it is desired to have an indication whether FM carrier is being received in the circuit whereby a voltage indication would be present even when a lower than normal frequency signal or no signal is being received. To perform this function there is provided a transistor 120 having emitter 123, base 124, and collector 126. The collector 126 of the transistor 120 is the output electrode thereof and is directly connected to the terminal 19, while being also connected through a resistor 128 to the positive power supply 10. The emitter 123 of the transistor 120 is directly connected to the ground line 14.

The base 124 of the transistor 120 is the control electrode thereof and is coupled through two resistors 130 and 132 to the collector 46 of the transistor 40. A capacitor 134 is coupled from a point between the resistors 130 and 132 to the ground line 14, while two resistors 136 and 138 are connected from the same point between the resistors 130 and 132 to the negative power supply 12.

The circuit centered about the transistor 120 has the function in the facsimile system of providing an indication that FM carrier is being received at the receive-mode transceiver. The effect of this carrier-reception indication is described in more detail in application Ser. No. 537,177 filed Mar. 24, 1966, on behalf of Paul J. Crane entitled "Readiness Monitoring System" which in turn is a continuation-in-part of application Ser. No. 488,459 (now abandoned) filed Sept. 20, 1965 and entitled "Readiness Monitoring System." Briefly speaking, the indication that carrier is being received is used to provide a signal that is applied at the terminal 156 of FIGURE 4 of application Ser. No. 537,177. The presence of a carrier-reception signal at 156 is necessary in order to activate the motor 22 of the receive-mode transceiver.

Therefore, the circuit centered about the transistor 120 is adapted to provide a signal indicative of whether or not the frequencies received at 16 are above or below the frequency band of the FM carrier to be received from the transmit-mode transceiver. The exact critical frequency of the circuit may be adjusted by varying the value of the resistor 138. In effect, the signal on the collector 46 of the monostable multivibrator transistor 40 is processed in the conventional form heretofore used to provide the indication on the terminal 19. Thus the capacitor 134 is chosen of such value as to provide low-pass filtering of the waveform 3C, with the result being a smooth variable DC voltage signal as represented by the waveform G of FIGURE 3. The magnitude of the voltage of the waveform G is approximately proportional to the frequency of pulses received at 16 all the way down to zero frequency.

The operation of the above-described video detector circuit is as follows. Referring to FIGURE 3, input pulses derived by the limiting and differentiation of FM carrier received by the receive-mode transceiver appear at the input terminal 16. These pulses are negative-going and thus cause the base 24 of the normally-off transistor 20 to go negative of the emitter 22, whereupon the transistor 20 switches on. FIGURE 3B shows the result of this switching on the collector 26 of the transistor 20. When the transistor 20 is off, the collector 26 drops to a voltage level near that of the ground line 14. However, the moment the transistor 20 is switched on, its collector 26 is almost directly connected to the positive power supply 10, thus causing a steep rise 200 at the leading edge of each pulse shown in FIGURE 3B. Trailing edges 202 of the FIGURE B pulses occur when the transistor 40 switches on again after having been held off while the transistor 20 was on.

The transistor 40 is normally held in its saturated state because while its directly coupled emitter 42 is always at the potential of the positive power supply 10, its base 44 is below that potential because of the voltage division between the power supply 10 and the ground line 14 through the resistors 48 and 52. When the transistor 20 switches on, the high voltage levels 204 of the pulses 3B are coupled through the capacitor 56 and diode 50 to the base 44, causing its current input to be removed. Thus the transistor 40 is switched off when the transistor 20 switches on. The effect upon its collector 46 is shown by the leading edge 210 of the waveform of FIGURE 3C. The duration of the waveform of FIGURE 3C is nearly the same as the duration of the waveform B, because both transistors 20 and 40 are switched at nearly the same time when discharged of the capacitor 56 permits the base 44 to drop below the voltage of the emitter 42 once again. Thereupon the voltage on the collector 46 is returned to the positive supply 10 shown at 212. Since the collector 46 is coupled to the base 24 of the transistor 20, the transistor 20 is cut off nearly simultaneously because its base 24 is at the same voltage as its emitter 22.

The waveform B of FIGURE 3 is also coupled to the base 34 to cut off the transistor 30. The transistor 30 is normally "on," as is the transistor 40, and for roughly the same reason—because while its emitter 32 is directly coupled to the positive power supply its base 34 is held at a potential below that of the positive power supply due to the voltage division between the positive power line 10 and ground 14 through the resistors 80 and 82. The steep rise 200 of the waveform B, however, causes the collector voltage of the transistor 30 (shown as the waveform D of FIGURE 3) to drop because the transistor 30 is no longer switched on to the positive power supply line 10. The drop 216 goes to a lower voltage level 218 very near that of the ground line 14. Since the waveform D and the waveform B are effectively summed in a logic sense to provide the waveform E of FIGURE 3, the slow rise of the leading edge 216 as contrasted with the fast rise of the leading edge 200 leaves a slightly momentary difference which results in the transient 120 that was discussed above.

When the pulses indicated at A have a relatively low frequency, the capacitor 72 is able to be recharged through a circuit including the resistor 76 and the rheostat 78 after the fall 202, but before the next trigger pulse A. This causes the operation of the transistor 30 to correspond substantially to the operation of the transistors 20 and 40 so that the transistor 100 never becomes non-conductive and no pulses 222 are produced, except for the pulse produced as a result of the slow rise of the leading edge 216. However, when the frequency of the pulses indicated at A in FIGURE 5 exceeds a critical value dependent upon the setting up of the rheostat 78, the capacitor 72 cannot become fully recharged before the arrival of the next pulse A. This will cause the left plate of the capacitor 72 to be less positive after transistor 20 switches on and will then allow transistor 30 to switch back on sooner than if capacitor 72 had been fully recharged. The period of non-conductivity of the transistor 30 decreases as the frequency of the pulses A increases since the high RC constant of the capacitor 72 and the resistances 76 and 78 becomes increasingly ineffective in providing capacitor 72 with a sufficiently high voltage charge to render the transistor 30 non-conductive during all of the time that the transistor 20 is conductive.

According to a main principle of the instant invention, when recovery of capacitor 72 is not complete, the trailing edges 219 of the pulses of FIGURE 3D occur a short interval before the trailing edges 202, for the interval of time between each trailing edge 219 and each trailing edge 202 is a period when the voltage on the base 104 of the transistor 100 is determined by voltage division through the resistors 114 and 116 and the resistor 112. Because the resistors 114 and 116 in parallel are lower in value than the resistor 112, the base 104 rises above the voltage level of the emitter 102 which is coupled directly to ground 114. As a result, the transistor 100 is cut off for this period so that the voltage on its collector 106 drops to that of the negative power supply 12. This results in the pulse 122 which is the main and most important output of the circuit of FIGURE 2.

In this way, the duration of the pulse 122 is dependent upon the frequency of the pulses A in FIGURE 3 above a critical value such as 3000 pulses per second. Since a pulse rate of 3000 p.p.s. (pulses per second) corresponds to a "white" image, the pulses 122 are not provided with any width for a white image so that a ground potential is produced at the terminal 18. The production of a ground potential as a reference is important in stabilizing the operation of the system and in providing a reference for the proper production principally of white, but also of different shades of black. As the image progresses in different shades toward a completely black tone, the pulse rate of the pulses A increases and the duration of the pulses 122 correspondingly increases so that the direct potential average on the terminal 18 correspondingly becomes increasingly negative. This provides a reliable output on the terminal 18 of the characteristics of the image to be reproduced at each instant after it is passed through a filter that rejects frequencies of 3000 cycles per second and frequencies above 3000 cycles per second. This output is provided in a straightforward manner so as to simplify video filtering. It can be seen from examination of the waveforms B and D that the pulse 122 occurs only at those instants when both waveforms B and D are at their higher voltage levels, 204 for the waveform B and 226 for the waveform D. In this situation, the resistors 114 and 116 are essentially splitting the voltage division current which also passes through the resistor 112. The selection of the three resistors 112, 114 and 116 is such that, when the resistors 114 and 116 are acting in parallel this way, the voltage on the base 104 is above ground potential so that the transistor 100 is cut off and a negative potential is produced at the terminal 18. In all other time periods represented in FIGURE 3, one of the waveforms B or D is at a high level while the other is at a low level, so that voltage division occurs only through one of the resistors 114 and 116, operating in series with the resistor 112. In this situation the transistor 100 will be turned on.

In addition to the functions described above, the diode 54 performs certain additional functions of some importance. For example, the diode 54 operates to isolate the resistor 27 from the capacitor 56 so as to prevent the recharge time of the capacitor 56 from increasing the time that the transistor 20 is switching from a conductive to a non-conductive state. This is important in ensuring that the transistor 100 is switched rapidly from a non-conductive state to a conductive state in accordance with the instantaneous switching of the transistor 20 from a conductive state to a non-conductive state. The diode 84 provides a similar function in isolating the resistor 76 and the rheostat 78 from the capacitor 72 during the switching of the transistors but is also important in allowing the capacitor 72 to be recharged at a rate controlled by the resistor 76 and the rheostat 78 and independently of any other controls.

Referring to FIGURE 3F, the waveform shown there represents the voltage on the plate 57 of the capacitor 56 in the course of the operation of the circuit of FIGURE 2. As long as the waveform B is at its positive level 204 the waveform F is at a similar positive voltage 230 because the connection between the point B and the point F is through a diode 54. When the high voltage level 204 terminates at 202, however, the high level 230 of the waveform F declines along the slope 232 represented by the discharge of the capacitor 56 through the resistor 58. The discharge 232 ends when the plate 57 of the capacitor 56 reaches the voltage level of ground line 14 at 234. This voltage level 234 is, of course, determined by the drop below the ground level 14 across the junction of the diode 60 and thus is at essentially ground level. It should be noted that while the plate 57 is at the level 234 very near ground, the plate 62 of the capacitor 56 is at a higher voltage level caused by the diode action of the base emitter junction of transistor 40 connected to power supply 10. Thus when the level of the plate 57 jumps back to the higher voltage level 230, as represented by the leading edge 236, the voltage across the capacitors 56 is high enough to cause the voltage on the plate 62 to go to a level above the voltage at the power supply 10 until such time as the capacitor 56 is able to discharge through the resistor 52.

As was stated above, the performance of the capacitor 72 is essentially the same as that of the capacitor 56 except that the capacitor 72 does not have as steep a recharge curve 232 as does the capacitor 56. This is because the value of the resistors 76 and 78 is far higher than the value of the resistor 58. For example, in a circuit built according to the instant invention the value of the resistor 58 was 16K ohms, while the value of the resistor 76 was 182K ohms and the value of the resistor 78 was adjustable to as high as 50K ohms. The result is that while the capacitor 56 is able to recharge to its fully charge level 234 after transistor 20 turns off, but long before the next trigger pulse A arrives, the capacitor 72 cannot fully recharge between trigger pulses unless those trigger pulses are arriving at the lowest frequency to be handled by the detector—in the facsimile transmission system discussed herein, 3000 p.p.s. (the 1500 c.p.s. lower limit of the FM band, after doubling by full wave rectification).

To the extent that the capacitor 72 is not able to fully recharge, it will not reach that voltage level that it would normally reach if it were fully recharged. Because of the values of the resistors 52 and 82 are the same, this will mean that the capacitor 72 will be able to discharge from its high positive voltage down to the emitter voltage of transistors 30 and 40 more quickly than the capacitor 56. It is essentially this difference in discharge time that results ultimately in the pulses 122, for the difference in discharge time creates a difference in switching times between the transistor 30 and the transistor 40 (and therefor transistor 20) and thus a difference in time positioning between the trailing edge 219 and the trailing edge 202.

If the variable resistor 78 is properly adjusted, the pulse 122 will be non-existent or a mere transient that will filter out easily at the lower end of the FM carrier band width which, as mentioned above, represents "white level" or unmodulated FM carrier. In the smoothing or low-pass filtering circuitry which follows the circuit of FIGURE 2 and is connected to the terminal 18, the transient representing unmodulated FM would easily filter out because it is composed almost entirely of high frequency components and has almost no power included in its envelope.

On the other hand, as the waveforms A arrive at greater frequencies, so that the time duration between them is less, the capacitor 72 will not be able to fully recharge to the same voltage level as the level 234 of the capacitor 56. The result is that the transistor 30 will be able to switch on faster than the transistor 40 upon the introduction of each input pulse. This will mean that the trailing edge 219 will appear progressively farther forward of the trailing edge 202 in time as the trigger pulses of FIGURE 3A arrive at higher frequencies. The result at the terminal 18 of this relationship will be that the pulses 122 will be longer, of higher power content, or higher average negative voltage, and constituted of more low frequency components as the input frequency of the FM signal to be demodulated rises from its low white level toward its high black level. As the power and low frequency component content of the pulses 122 rises, and their average negative value rises, the DC output of the filtering networks connected to the terminal 18 will rise, giving very close reproduction of the original electrical signals produced by the pickup transducer 20 in the transmit-mode transceiver as discussed in connection with FIGURE 1.

Thus the circuit of FIGURE 2 achieves a detector signal appearing on the collector 106 of the transistor 100 which has a frequency corresponding to the input trigger pulse and has a width that is very closely proportional in a linear relationship with the increment in frequency above the frequency of the lowest carrier frequency in the FM band. This is an important accomplishment, for prior FM detectors normally had a large component even at the minimum carrier frequency; and even if this undesirable component were removed, the proportion of output was related not to the minimum carrier frequency, but to zero frequency, both of which are undesirable characteristics for accurate determination of white DC level (in an FM facsimile system where minimum frequency represents white) which become increasingly acute when the FM carrier is in the audio frequency range rather than being in the higher ranges normally used.

It can be seen from FIGURE 3E that the invention has gotten around the enormous filtering problems arising with prior audio-range FM demodulators, whereby the lowest frequency components and high power content were present in the detector output at the low end of the FM band. By reversal of roles accomplished essentially by subtracting the waveform B from the waveform D, applicant has achieved the more desirable condition of having the lower power content and the lowest proportion of low frequency components present in the output pulse 122 at the low end of the FM band. The inventive principle embodied in the circuit of FIGURE 2 might thus be broadly stated as the subtraction from a normal monostable multivibrator detector pulse of a second pulse which is width-varied as a function of the frequency of the FM signal to be demodulated.

An actual circuit built and operated according to the schematic of FIGURE 2 used the following components and values:

| | |
|---|---|
| Voltages: | |
| **10** | +18 volts DC. |
| **12** | —18 volts DC. |
| Transistors: | |
| **20** | 2N404. |
| **30** | 2N404. |
| **40** | 2N404. |
| **100** | 2N404. |
| **120** | S1054 (Fairchild). |
| Diodes: | |
| **50** | 1N3064. |
| **54** | 1N3064. |
| **56** | 1N3064. |
| **64** | 1N3064. |
| **70** | 1N3064. |
| **74** | 1N3064. |
| **84** | 1N3064. |
| **110** | 1N3064. |
| Resistors (in ohms): | |
| **27** | 82K. |
| **33** | 3,300. |
| **29** | 6,200. |
| **48** | 10K. |
| **52** | 100K. |
| **58** | 16K. |
| **66** | 15K. |
| **68** | 12K. |
| **76** | 182K. |
| **78** | 50K pot. |
| **80** | 3,300. |
| **82** | 100K. |
| **108** | 2,700. |
| **112** | 30K. |
| **114** | 51K. |
| **116** | 51K. |
| **130** | 75K. |
| **132** | 16K. |
| **136** | 100K. |
| **138** | 50K pot. |
| Capacitors (microfarads): | |
| **56** | 1600. |
| **72** | 1600. |
| **134** | 5.0. |

The input pulses applied at 16 had a rate of 3600 pulses per second and an amplitude of 4 volts, while the output pulses 122 had an amplitude of about —18 volts.

Thus applicant has achieved an improved detector for FM demodulation systems operating at low FM frequencies wherein a first monostable vibrator circuit and a second partial monostable vibrator circuit are effectively operated in parallel, both being triggered by the same input FM signals. However, according to the principles of the invention, the time-constant circuitry, resistances and capacitances of the two parallel monostable vibrators are chose differently, to the end that the first monostable multivibrator has a very quick recovery time while the second monostable multivibrator has just enough time to recover at the lowest frequency in the band width of the detector. Thereafter, at frequencies higher than the lowest frequency in the band width of the detector, the second monostable multivibrator is not able to recover fully and yields a shorter monostable period.

The result of the above circuit arrangement is that by summing, comparing, or similarly sensing and processing the output signals of the first monostable multivibrator and the second monostable multivibrator, it is possible to develop a detector output signal conditioned upon the simultaneous and coincident "on" state of both the first and second monostable multivibrators. Such an output signal will have its lowest power content and its highest frequency power component composition at the low end of the FM band being demodulated, while as the frequency of the FM input signal increases, the length of time when the first monostable and the second monostable are both on decreases, giving an overall result that a larger output signal is produced by the detector as the frequency of the FM signal goes up. Since at the low end of the FM band width almost no power is passed and moreover the output pulses 120 are constituted mostly of high frequency components and closely referenced to ground, applicant's low frequency detector has overcome the problems to which it was addressed: the difficult filtering problem and the problem of precise accuracy of DC output current level of the overall FM demodulator system shown at 35 in FIGURE 1.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

I claim as my invention:

1. In combination in a facsimile transmission system for producing on a piece of copy paper a copy of an original document at a distance therefrom utilizing standard commercial telephone transmission facilities:
- first holding means for holding the original documens;
- reading means operatively associated with the first holding means for producing an electrical signal representative of the contents of the original document;
- frequency modulating means electrically connected to the reading means for frequency-modulating the electrical signal from the reading means;
- sending means electrically connected to the frequency-modulating means for passing the frequency-modulated signal output thereof into the standard commercial telephone transmission facilities;
- receiving means remotely located from the sending means for receiving frequency-modulated signals from the standard commercial telephone transmission facilities;
- demodulating means electrically connected to the receiving means for demodulating the frequency-modulated electrical signals from the standard commercial telephone transmission facilities, said demodulating means being characterized in that a detector circuit is used therein which produces pulses of increased power content as the frequency-modulated electrical signals increase in frequency;
- second holding means for holding the copy paper on which the contents of the original document are to be reproduced; and
- reproducing means operatively associated with the second holding means and electrically connected to the demodulating means for reproducing the contents of the original document in response to the output of the frequency-modulated signal demodulating means.

2. The facsimile transmission system of claim 1 with the addition that said demodulating means produces pulses of uniform height but added length as the frequency of said frequency-modulated signals increases.

3. The facsimile transmission system of claim 1 wherein:
- the frequency-modulated signal produced by the frequency-modulating means has an FM bandwidth and has the lowest frequency in the FM bandwidth representing the white or unmarked portions of the original; and
- the detector circuit in said demodulating means produces pulses of lowest power and highest constituent harmonic content at said lowest frequency.

4. The facsimile transmission system of claim 1 wherein the detector includes two monostable multivibrators, one of which has a frequency-variable output pulse length.

5. In a facsimile system wherein frequency modulated signals are produced at a transmitter to represent an image at each instant in accordance with the frequency of the modulated signals at each instant and wherein the frequency-modulated signals are transmitted and wherein the image is provided at each position on the image with a variable amount of white and black colors to define the image, a receiver for receiving the transmitted signals and for producing the image on a medium, including:
- first means for receiving the frequency-modulated signals which are transmitted,
- second means operatively coupled to the first means for converting the frequency-modulated signals to signals having substantially no duration in representation of a white color and having a progressively increasing duration in progressively increasing shades of color toward black,
- third means operatively coupled to the second means for producing a reference voltage for a white color and for producing progressive variations from the reference voltage for progressive variations toward a black color, and
- fourth mean operatively coupled to the third means for reproducing the image on the medium in accordance with the voltage produced by the third means at each instant.

6. The receiver set forth in claim 5 wherein:
- the second means includes a first stage having a relatively fast response time greater than that required to respond to the frequencies of all of the frequency-modulated signals received by the first means and includes a second stage having a relatively slow response time in comparison to the response time of the first stage and less than the frequencies of at least some of the frequency-modulated signals received by the first means and includes a third stage responsive to the difference in the response of the first and second stages for converting the frequency-modulated signals to signals having no duration in representation of a white color and having a progressively increasing duration in progressively increasing shades of color toward black.

7. The receiver set forth in claim 5 wherein the first stage includes a first resistor and a first capacitor for providing the relatively fast response time and wherein the second stage includes a second resistor and a second capacitor for providing the relatively slow response time.

8. In a facsimile system wherein frequency-modulated signals are produced at a transmitter to represent an image at each instant in accordance with the frequency of the modulated signals at each instant and wherein the frequency-modulated signals are transmitted and wherein the image is provided at each position with a variable amount of white and black color to define the image, a receiver for receiving the transmitted signals and for reproducing the image on a medium, including:
- first means for receiving the frequency-modulated signals which are transmitted,
- second means having a first response time faster than the duration of any of the received signals to provide first signals of reference duration in accordance with the reception of the transmitted signals,
- third means having a response time slower than the duration of the received signals for operating upon the received signals to provide second signals having a progressively increasing duration in accordance with progressive increases in the frequency of the received signals and having the reference duration for a white color,
- fourth means operatively coupled to the second and third means for providing a third signal having a duration dependent upon the difference in duration of the first and second signals and having no duration for a white color,
- fifth means operatively coupled to the fourth means for producing a reference voltage for a white color and a voltage progressively varying from the reference voltage for progressive durations of the third signal, and
- sixth means operatively coupled to the fifth means for producing a color at each instant in accordance with the voltage from the fifth means at that instant.

9. The receiver set forth in claim 8 wherein the second means includes a first resistor and a first capacitor with a relatively short time-constant and the third means includes a second resistor and a second capacitor with a relatively long time-constant.

References Cited

UNITED STATES PATENTS 3,296,539 1/1967 Felix ............... 329—104

OTHER REFERENCES

"Radio-Facsimile by Sub-Carrier Frequency Modulation," Mathes and Whitaker, pamphlet.

RICHARD MURRAY, Primary Examiner

R. L. RICHARDSON, Assistant Examiner

U.S. Cl. X.R.

178—7.1, 7.3; 179—2; 329—110

UNITED STATES PATENT OFFICE

CERTIFICATE OF CORRECTION

Patent No. 3,467,772 Dated September 16, 1969

Inventor(s) PAUL J. CRANE

It is certified that error appears in the above-identified patent and that said Letters Patent are hereby corrected as shown below:

Please correct the drawing in Figure 2 to show element 64 as a diode and to show that there is no connection between resistor 116 and the junction of resistors 76 and 78.

Signed and sealed this 25th day of January 1972.

(SEAL)
Attest:

EDWARD M.FLETCHER,JR.
Attesting Officer

ROBERT GOTTSCHALK
Commissioner of Patents